United States Patent [19]
Mattson

[11] Patent Number: 4,909,480
[45] Date of Patent: Mar. 20, 1990

[54] COIL SPRING COMPRESSOR

[76] Inventor: Charles T. Mattson, 5184 Sonoma Hwy., Santa Rosa, Calif. 95405

[21] Appl. No.: 318,011

[22] Filed: Mar. 2, 1989

[51] Int. Cl.$^4$ .............................................. B23P 19/04
[52] U.S. Cl. ..................................... 254/10.5; 29/227; 267/177
[58] Field of Search ......................... 267/177; 29/227; 254/10.5

[56] References Cited

U.S. PATENT DOCUMENTS

| | | | |
|---|---|---|---|
| 4,009,867 | 3/1977 | Diffenderfer | 29/227 X |
| 4,054,983 | 10/1977 | Cowan | 29/227 |
| 4,105,188 | 8/1978 | Mendoza et al. | 254/10.5 |
| 4,395,020 | 7/1983 | Spainhour | 29/227 X |
| 4,541,614 | 9/1985 | Klann | 29/227 X |

Primary Examiner—George E. A. Halvosa
Attorney, Agent, or Firm—Melvin R. Stidham

[57] ABSTRACT

The disclosure is of a compressor for the coil spring of a MacPherson strut. It comprises a top force transfer ring and a bottom U-shaped, helical ramp plate secured together in spaced relationship by tie bars. The U-shaped ramp plate is inserted between coils of the spring to surround the central, shock absorber stem. Then when the device is rotated, the ramp plate is threaded down the coil spring to pull it up into the containment between the tie bars. The slight compression of the coil spring in this manner relieves force against the spring mounting to enable repair and or change of the shock absorber.

10 Claims, 1 Drawing Sheet

COIL SPRING COMPRESSOR

BACKGROUND OF THE INVENTION

In repairing automobile suspension devices, such as the MacPherson strut, it is generally necessary to compress the surrounding coil spring to relieve the load on the strut and then remove the shock absorber unit for replacement or repair of the unit. Presently available spring compressors for repair of MacPherson struts generally comprise a pair of arcuate vise-like shoes or jaws, which are inserted between spaced coils of the spring and then squeezed together by a suitable means, such as a threaded bolt, to compress the spring. Generally, however, such spring compressors can only grip coils intermediate the length of the spring, and cannot grip the spring at or near its extremities. Accordingly, it may be necessary to compress the intermediate portion of the spring several inches before the end coils are sufficiently relaxed to relieve the spring load against the end mounting plates of the strut. One such spring compressor is shown and described in my prior U.S. patent No. 4,276,684.

Another disadvantage of known coil compressors resides in the fact that it is necessary to enter the coil spring laterally from one side in order to compress the coils. That leaves the opposite side of the spring unprotected. If the grip on the compressed coil is suddenly and inadvertently released, there is nothing to prevent the spring from being projected suddenly, and under significant spring force, from the clamp, possibly to cause damage and/or serious bodily injury.

OBJECTS OF THE INVENTION

It is an object of this invention to provide a spring compressor that can compress a coil spring over substantially its full length.

It is a further object of this invention to provide a coil spring compressor that can be centered on a coil spring to compress the spring evenly around its circumference from the top thereof.

It is a further object of this invention to provide a coil spring compressor that can grip and compress a coil spring evenly while holding the spring confined.

It is a further object of this invention to provide a MacPherson strut coil spring compressor, which can be operated manually and which requires only a small amount of spring compression to release the strut.

Other objects and advantages of this invention will become apparent from the description to follow, particularly when read in conjunction with the accompanying drawing.

SUMMARY OF THE INVENTION

In carrying out this invention, I provide a top adapter plate and a bottom bifurcated helical ramp plate which are joined together on three sides by tie bars. The top adapter plate may be centered on the top mounting plate of a MacPherson strut and the bifurcated ramp plate, which is bent to form a helical top surface, is inserted in from the side of the coil spring near the bottom thereof. The three tie bars, together with an upstanding guide post, which is fixed to the helical ramp plate, completely contain the coil spring and prevent its accidental removal. A radial slot in the helical ramp bottom plate enables the ramp plate to be inserted into the side of the coil spring to straddle the central shock absorber stem and engage around a helical coil of the spring. Then, the entire assembly can be rotated manually by turning diametrically opposite radial arms to "thread" the helical ramp plate down the coil spring. Since the distance from the top of the spring unit is fixed by the upright tie bars, the threading movement pulls the bottom coils of the spring up into the assembly to compress the spring and hold it contained between the tie bars. Generally after less than one full turn, the spring is sufficiently compressed that the bottom coil no longer asserts any force against the bottom plate of the strut. In this condition, a nut may be removed from the top of the shock absorber core to enable it to be removed as a unit from the coil spring. When the shock absorber unit is repaired or replaced by a new unit it can be inserted back up through the coil spring and again bolted to the top mounting plate, all while the spring is held within the compressor assembly and prevented from causing any damage.

DESCRIPTION OF A PREFERRED EMBODIMENT

Figure 1:
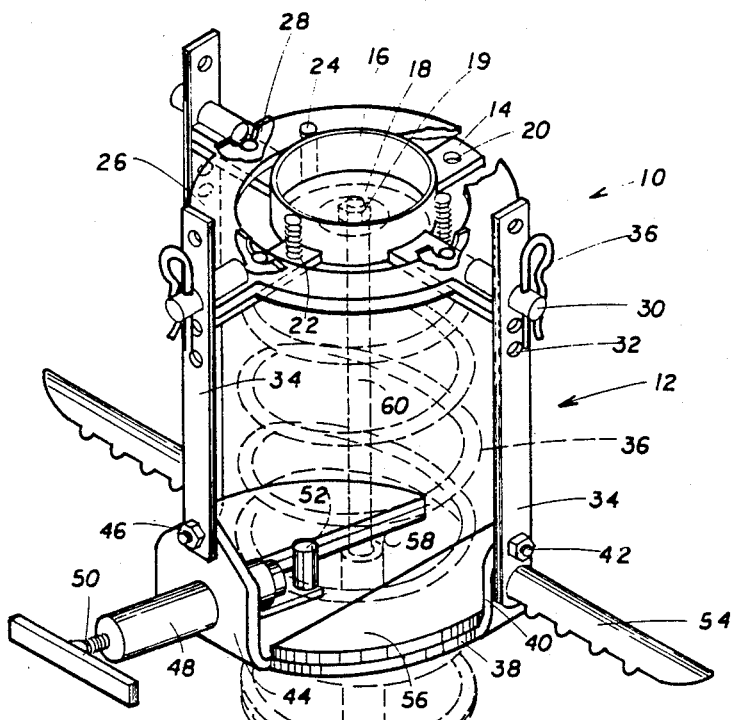
FIG. 1 is a view in perspective of the coil spring compressor of this invention.
Figure 2:
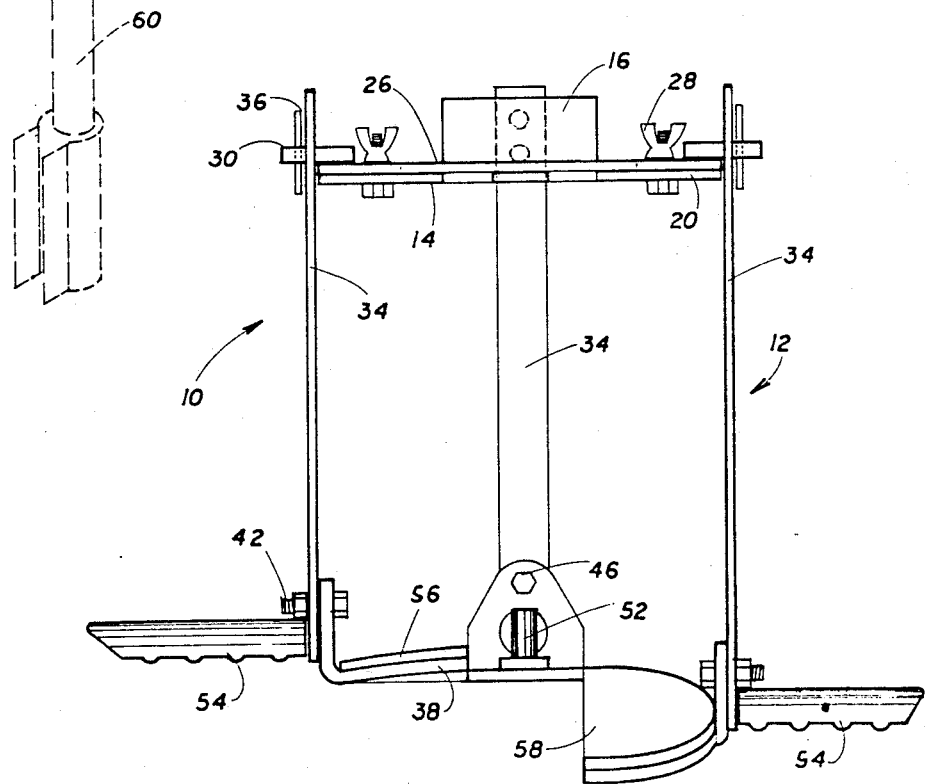
FIG. 2 is a side view of the coil spring compressor.

Referring now to the drawing with greater particularity, the coil spring compressor 10 comprises a cage-like frame work or containment 12. The containment 12 includes an adapter plate 14 comprising a central ring 16 to be centered on the mounting plate 18 of a MacPherson strut within the usual circle of mounting bolts 24. Four radial arms 20 are secured to the centering ring, and where there is a three bolt pattern as shown, an opening 22 in one of the arms is received over a bolt 24 on the strut mounting plate 18. In the case of a four bolt pattern, the adapter plate can be positioned so that each of the arms 20 will fall between bolts. In any event, the engagement of the arms on one or more bolts prevents rotation of the adapter plate 14 relative to the mounting plate 18.

The containment 12 also includes a force transfer ring 26, which is preferrably secured to the adapter plate by means of wing nuts 28. Force transmitting pins 30 which are welded or otherwise secured to the force transfer ring 26 are received in selected openings 32, which are formed in upright tie bars 34, the pins then being secured in place by cotter pins 36 or the like.

The tie bars 34 extend around three sides of the coil spring 36, and secured to the lower ends thereof is a helical thread ramp plate 38. Integral upright brackets 40 on the ramp plate 38 are secured to the lower ends of two of the tie bars 34 by means of bolts 42 and a third bracket 44 is bolted at 46 to the third tie bar 34. The bracket 44 carries a threaded bolt 48 that receives a lock bolt 50, which may be threaded into gripping engagement with a coil of the coil spring 36, the coil being received between the lock bolt 50 and a guide post 52. Preferably the guide post 52 may be mounted in a selected one of a radial series of tapped holes, depending on the diameter of the coil spring 36, to guide the spring closely.

With the lock bolt 50 free of gripping engagement with the coil spring 36, the entire containment 12 may be rotated around the coil spring 36 by means of gripping handles 54. Turning of the containment 12 is facilitated by suitable pads 56 of a low friction material, such as TEFLON.

It will be noted that the helical ramp plate may be of circular configuration with a wide radial slot 58 to be received over the stem 60 of the MacPherson strut so as to be centered thereon. The opposite arms 38 of the U-shaped helical ramp plate are bent to form a helical ramp around the outer edge thereof to engage under the helical coil of the spring 36. With the containment 12 in place, it may be rotated as a unit by gripping the handles 54 and, in effect, threaded down the helical coil of the spring 36. However, since the top compressor ring 26 is engaging the strut mounting plate 18, the containment 12 cannot move down the coil spring and, instead, the helical ramp plate 38 compresses the coil spring upward against the top force transfer plate 26.

In operation, one selects an adapter plate 14 of a diameter to fit on the strut mounting plate 18 and within the bolt circle 24. The helical ramp plate 38 is inserted laterally into the coil spring above the bottom coil, and appropriate holes in the tie bars 34 are inserted over the pins 30 on the top force transfer ring 26 and secured in place. The guide post 52 is threaded into the helical ramp plate 38 to engage the inside of the coil spring and prevent inadvertant ejection of the coil spring through the only open side of the containment 12. The containment 12 is rotated to "thread" the coil spring up above the ramp plate 38 while the stem 60 is held firmly in a suitable gripping device such as a bench vise.

When the coil spring is sufficiently compressed that it no longer applies a force to the bottom of the strut mounting plate 18, the lock bolt 50 can be tightened to engage the side of the coil spring 36 firmly and prevent reverse threading of the lower helical ramp plate 38. Finally, the nut 19 can be loosened to remove the spring from the strut assembly and enable repair and/or replacement thereof. A new strut can then be inserted into the contained coil spring and, after the nut 19 is replaced and tightened, the containment 12 can be unthreaded from the coil spring to its normal active position.

While this invention has been described in conjunction with a preferred embodiment thereof, it is obvious that modifications and changes therein can be made by those skilled in the art to which it pertains without departing from the spirit and scope of this invention, as defined by the claims appended hereto.

What is claimed as invention is:

1. A compressor for the coils of a coil spring of a MacPherson strut with a central stem and top counting plate comprising:
   a top adaptor plate;
   centering means on said adapter plate for centering it on the top mounting plate
   turn-limiting means on said adapter plate for preventing rotation thereof relative to said mounting plate;
   a bottom, helical thread shaped ramp plate in generally parallel, spaced relationship to said top adapter plate;
   means forming a radial slot in said ramp plate so that said ramp plate may be inserted laterally from one direction around said central stem and into engagement with the helical coil of a coil spring;
   three tie bars interconnecting said adapter plate and said ramp plate to hold them in fixed, spaced relationship and to block removal of a coil spring from between said plates; and
   means for turning said plates about the axis of a coil spring to thread said ramp plate thereon and thereby compress said coils between said bottom ramp plate and said top adapter plate.

2. The spring compresor defined by claim 1 including:
   guide means on said ramp plate positioned to engage a coil of said spring to guide said ramp plate therearound.

3. The spring compressor defined by claim 1 including:
   lock means engageable with a coil spring to prevent rotation of said ramp plate thereon.

4. The spring compressor defined by claim 1 including:
   an upright guide post on said ramp plate positioned to engage the radially inner surface of said spring;
   a radially disposed lock nut threaded on said ramp plate to squeeze a coil of said spring between said lock nut and said guide post and prevent rotation of said ramp plate.

5. The spring compressor defined by claim 1 wherein said top adapter plate comprises:
   a centering ring to fit within the bolt pattern of said top mounting plate;
   radial arms extending outward from said centering ring to engage a bolt on said top mounting plate; and
   pins on said top adapter plate engageable in complementary holes in said tie bars.

6. The spring compressor defined by claim 5 including:
   a force transfer ring carrying said pins, said force transfer ring being supported on said radial arms.

7. The spring compressor defined by claim 5 wherein:
   there are four radial arms on said centering ring equally spaced around said centering ring to engage the sides of bolts protruding from said top mounting plate in a four bolt pattern.

8. The spring compressor defined by claim 5 wherein:
   there are four radial arms equally spaced around said centering ring;
   and including:
      means forming a slot in one of said arms to receive a protruding bolt protruding from said top mounting plate in a three bolt pattern.

9. A compressor for the coil spring of a MacPherson strut comprising:
   a top force transfer ring;
   a bottom, helical thread shaped ramp plate in generally parallel, spaced relationship to said transfer ring;
   tie bars interconnecting said transfer ring and said ramp plate on three sides leaving one side open;
   said tie bars holding said transfer ring and said ramp plate in fixed spaced relationship;
   means forming a radial slot in said ramp plate so that said ramp plate may be inserted laterally from said one side into engagement with the helical coil of a coil spring;
   means for turning said plates about the axis of a coil spring to thread said ramp plate thereon and thereby compress said coil spring between said transfer ring and said ramp plate; and
   removable guide means on said ramp plate positioned to engage a coil of said spring to prevent lateral movement thereof toward said one side.

10. The spring compressor defined by claim 9 including:
    lock means engageable with a coil spring to prevent rotation of said ramp plate thereon.

* * * * *